(12) United States Patent
Becker et al.

(10) Patent No.: US 10,489,408 B2
(45) Date of Patent: Nov. 26, 2019

(54) SYSTEMS AND METHODS FOR COLOR PALLETE SUGGESTION

(71) Applicant: Shutterstock, Inc., New York, NY (US)

(72) Inventors: Chris Becker, New York, NY (US); David Kroner, Brooklyn, NY (US); Steve Blaurock, Queens, NY (US)

(73) Assignee: Shutterstock, Inc., New York, NY (US)

( * ) Notice: Subject to any disclaimer, the term of this patent is extended or adjusted under 35 U.S.C. 154(b) by 796 days.

(21) Appl. No.: 14/701,556

(22) Filed: May 1, 2015

(65) Prior Publication Data

US 2015/0324394 A1    Nov. 12, 2015

Related U.S. Application Data

(60) Provisional application No. 61/988,962, filed on May 6, 2014.

(51) Int. Cl.
*G06F 17/30* (2006.01)
*G06F 16/2457* (2019.01)
(Continued)

(52) U.S. Cl.
CPC ...... *G06F 16/24578* (2019.01); *G06F 16/248* (2019.01); *G06F 16/313* (2019.01); *G06F 16/5838* (2019.01); *G06F 16/5866* (2019.01)

(58) Field of Classification Search
CPC ............. G06F 17/3053; G06F 17/3025; G06F 16/248; G06F 16/5838; G06F 16/24578
(Continued)

(56) References Cited

U.S. PATENT DOCUMENTS 5,086,295 A * 2/1992 Boettcher ............... G09G 5/02
                                                    345/600
5,299,116 A * 3/1994 Owens .................. G06Q 10/087
                                                    235/385
(Continued)

FOREIGN PATENT DOCUMENTS

WO    2014070168    5/2014
WO    2014070914    5/2014
(Continued)

OTHER PUBLICATIONS

Flickner et al., "Query by image and video content: The QBIC system," Computer, 28(9) pp. 23-32, 1995.
(Continued)

*Primary Examiner* — Pierre M Vital
*Assistant Examiner* — Nargis Sultana
(74) *Attorney, Agent, or Firm* — McDermott Will & Emery LLP

(57) ABSTRACT

Methods and systems for searching images in response to a keyword and color palette selection criteria. The method comprising: searching a first database to locate a set of pertinent images satisfying a keyword and color palette selection criteria; displaying the set of pertinent images and the set of colors; generating a set of suggested color palettes; displaying on the user interface the set of pertinent images which match the keyword and the single color specified by the single color option; displaying the set of pertinent images which match the combination specified by the first set of colors; dynamically extracting and displaying the color palette from a first image in response to receiving an input indicating a cursor hovering over the first image; and performing a first set of operations in response to receiving a user selected color palette extracted from the first image.

20 Claims, 9 Drawing Sheets
(8 of 9 Drawing Sheet(s) Filed in Color)

| Iteration Number | Color 1 | Color 2 | distance between color 1 and color 2 | Palette Number |
|---|---|---|---|---|
| 1 | red | light red | 10 | 2 |
| 2 | red | dark red | 10 | 3 |
| 3 | red | darker red | 20 | 4 |
| 4 | red | yellow | 50 | 5 |

(51) Int. Cl.
   *G06F 16/248* (2019.01)
   *G06F 16/31* (2019.01)
   *G06F 16/583* (2019.01)
   *G06F 16/58* (2019.01)

(58) Field of Classification Search
   USPC .................................................... 707/733
   See application file for complete search history.

(56) References Cited

U.S. PATENT DOCUMENTS

| | | | | |
|---|---|---|---|---|
| 5,307,182 | A * | 4/1994 | Maltz | H04N 1/40006 358/504 |
| 5,313,231 | A * | 5/1994 | Yin | G06F 7/768 345/545 |
| 5,434,957 | A * | 7/1995 | Moller | G09G 5/06 345/593 |
| 6,185,385 | B1 * | 2/2001 | Mestha | G03G 15/5041 399/46 |
| 6,385,336 | B1 * | 5/2002 | Jin | G06T 11/001 382/162 |
| 6,518,981 | B2 | 2/2003 | Zhao | |
| 6,859,210 | B2 * | 2/2005 | Luo | H04N 1/644 345/581 |
| 7,023,577 | B2 * | 4/2006 | Watanabe | G06K 15/00 358/1.9 |
| 7,126,612 | B2 * | 10/2006 | Sekiguchi | G06K 9/2018 345/589 |
| 7,715,624 | B2 * | 5/2010 | Nishida | G06K 9/00442 358/462 |
| 7,864,999 | B2 * | 1/2011 | Chang | G06T 5/001 382/128 |
| 7,873,521 | B2 | 1/2011 | Kurozumi et al. | |
| 8,502,864 | B1 * | 8/2013 | Watkins | G03B 35/00 348/52 |
| 8,508,547 | B2 * | 8/2013 | Klassen | G06T 11/001 345/581 |
| 8,576,241 | B1 * | 11/2013 | Kanter | G06K 9/4652 345/589 |
| 8,587,604 | B1 | 11/2013 | Kanter et al. | |
| 8,593,478 | B2 * | 11/2013 | O'Brien-Strain | H04N 1/644 345/589 |
| 8,630,485 | B2 * | 1/2014 | Cok | G06T 11/001 382/162 |
| 8,634,640 | B2 * | 1/2014 | Bhatti | G01J 3/462 382/167 |
| 8,756,241 | B1 | 6/2014 | Thite | |
| 8,890,884 | B2 * | 11/2014 | Zhang | G09G 3/3607 345/549 |
| 9,002,100 | B2 | 4/2015 | Lecerf | |
| 9,390,168 | B1 * | 7/2016 | Dykstra | G06F 16/686 |
| 9,582,517 | B2 | 2/2017 | Chester et al. | |
| 9,792,303 | B2 * | 10/2017 | Sayre, III | G06F 16/54 |
| 2001/0003814 | A1 | 6/2001 | Hirayama et al. | |
| 2002/0080153 | A1 * | 6/2002 | Zhao | H04N 1/644 715/700 |
| 2002/0094124 | A1 | 7/2002 | Kim | |
| 2005/0055344 | A1 * | 3/2005 | Liu | G06F 16/58 |
| 2006/0193538 | A1 | 8/2006 | Vronay et al. | |
| 2006/0195325 | A1 | 8/2006 | Tateson et al. | |
| 2006/0218522 | A1 * | 9/2006 | Hanechak | G06F 16/58 717/105 |
| 2006/0248081 | A1 * | 11/2006 | Lamy | G01J 3/46 |
| 2007/0188445 | A1 | 8/2007 | Silverstein et al. | |
| 2007/0188478 | A1 | 8/2007 | Silverstein | |
| 2008/0046409 | A1 * | 2/2008 | Lieb | G06F 16/5838 |
| 2008/0046410 | A1 * | 2/2008 | Lieb | G06F 16/5838 |
| 2009/0003892 | A1 * | 1/2009 | Sakaizawa | G03G 15/0812 399/284 |
| 2009/0041345 | A1 | 2/2009 | Tirumalareddy et al. | |
| 2009/0252404 | A1 | 10/2009 | Lecerf | |
| 2009/0281925 | A1 * | 11/2009 | Winter | G06Q 30/0601 705/26.1 |
| 2010/0158412 | A1 * | 6/2010 | Wang | G06F 16/5838 382/305 |
| 2011/0085697 | A1 * | 4/2011 | Clippard | G06K 9/4652 382/100 |
| 2011/0135195 | A1 * | 6/2011 | Marchesotti | G06K 9/4652 382/165 |
| 2011/0184950 | A1 | 7/2011 | Skaff | |
| 2011/0191334 | A1 * | 8/2011 | Hua | G06F 16/00 707/726 |
| 2011/0289082 | A1 * | 11/2011 | Townsend | G06Q 50/10 707/733 |
| 2011/0313927 | A1 * | 12/2011 | Savilia | G06Q 30/02 705/50 |
| 2012/0045121 | A1 * | 2/2012 | Youngman | G06Q 30/0601 382/162 |
| 2012/0075329 | A1 | 3/2012 | Skaff et al. | |
| 2012/0099784 | A1 * | 4/2012 | Marchesotti | G06F 16/5838 382/162 |
| 2012/0163710 | A1 | 6/2012 | Skaff et al. | |
| 2012/0166472 | A1 | 6/2012 | Hoppenot et al. | |
| 2012/0189340 | A1 * | 7/2012 | Hagiwara | B41J 2/32 399/82 |
| 2012/0195499 | A1 * | 8/2012 | Hosomi | G06F 16/58 382/162 |
| 2012/0224764 | A1 * | 9/2012 | Weng | G09B 19/0023 382/159 |
| 2012/0239506 | A1 | 9/2012 | Saunders et al. | |
| 2012/0254790 | A1 * | 10/2012 | Colombino | G06F 3/0482 715/781 |
| 2013/0073336 | A1 * | 3/2013 | Heath | G06Q 30/02 705/7.29 |
| 2013/0304604 | A1 * | 11/2013 | Hoffman | G06Q 30/0621 705/26.5 |
| 2014/0019484 | A1 * | 1/2014 | Coppin | G06F 16/5838 707/772 |
| 2014/0055484 | A1 * | 2/2014 | Moon | G06T 11/001 345/593 |
| 2014/0089295 | A1 * | 3/2014 | Becherer | G06F 16/3328 707/722 |
| 2014/0089781 | A1 * | 3/2014 | Hoguet | G06F 17/211 715/234 |
| 2014/0096009 | A1 | 4/2014 | Grosz et al. | |
| 2014/0201634 | A1 * | 7/2014 | Hill | G06F 3/0482 715/716 |
| 2014/0270498 | A1 * | 9/2014 | Chester | G06K 9/4652 382/162 |
| 2014/0304661 | A1 * | 10/2014 | Topakas | G06F 3/04815 715/848 |
| 2014/0334722 | A1 * | 11/2014 | Bloore | G06F 16/5838 382/164 |
| 2015/0039994 | A1 * | 2/2015 | Hoguet | G09G 5/06 715/234 |
| 2015/0046254 | A1 * | 2/2015 | Raab | G06Q 30/0248 705/14.47 |
| 2015/0081469 | A1 * | 3/2015 | Acharyya | G06Q 30/0631 705/26.7 |
| 2015/0110381 | A1 | 4/2015 | Parvin et al. | |
| 2015/0170380 | A1 * | 6/2015 | Duwenhorst | G06F 16/5838 345/594 |
| 2015/0181469 | A1 | 6/2015 | Yu | |
| 2015/0199010 | A1 | 7/2015 | Coleman et al. | |
| 2015/0220578 | A1 * | 8/2015 | Hunt | G06F 16/137 707/747 |
| 2015/0310010 | A1 * | 10/2015 | Brenner | G06F 16/48 707/730 |
| 2015/0324365 | A1 | 11/2015 | Becker et al. | |
| 2015/0324366 | A1 | 11/2015 | Becker et al. | |
| 2015/0324392 | A1 | 11/2015 | Becker et al. | |
| 2015/0378999 | A1 * | 12/2015 | Dorner | G06Q 30/0627 707/745 |

(56) References Cited

U.S. PATENT DOCUMENTS

2015/0379004 A1* 12/2015 Sayre, III ................ G06F 16/54
707/772
2016/0092742 A1* 3/2016 Chen .................. G06K 9/00825
382/103

FOREIGN PATENT DOCUMENTS

WO    WO 2014070168    5/2014
WO    WO2014070914    5/2014

OTHER PUBLICATIONS

Flickner, et a., "Query by image and video content: The QBIC system," Computer 28(9), pp. 23-32 1995.
Smith, et al., "VisualSEEK: a fully automated content-based image query system", In Proceedings of the fourth ACM International Conference on Multimedia, pp. 87-89, ACM, 1997.

* cited by examiner

Figure 1:
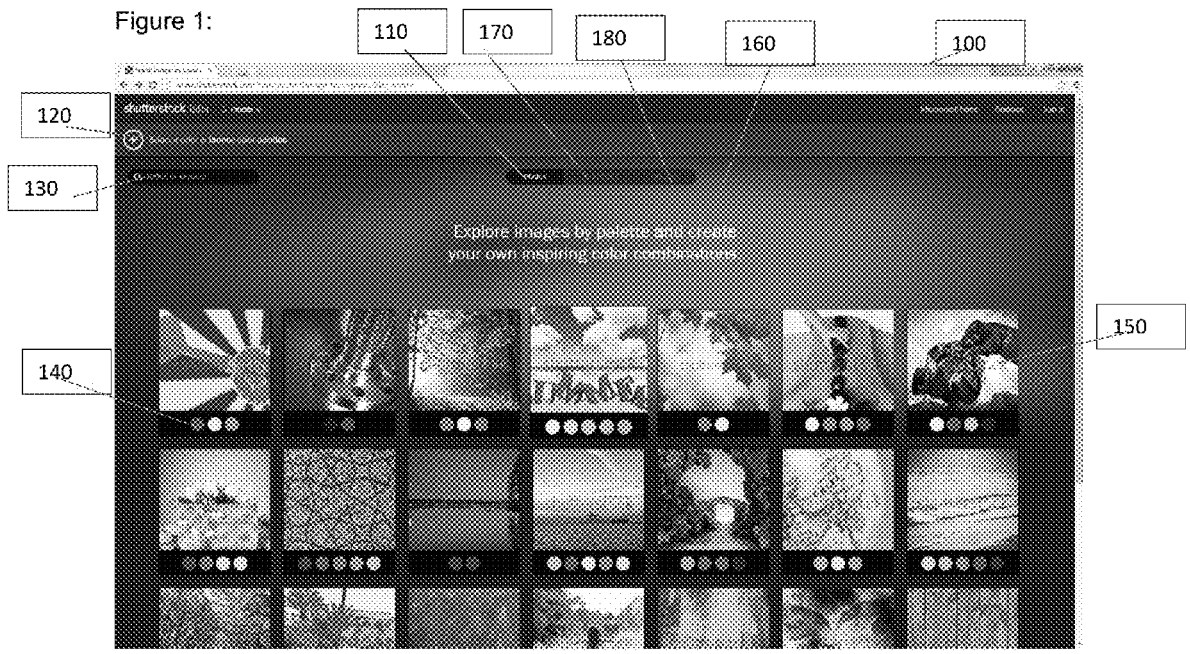
Figure 2 select image 4 from figure 1
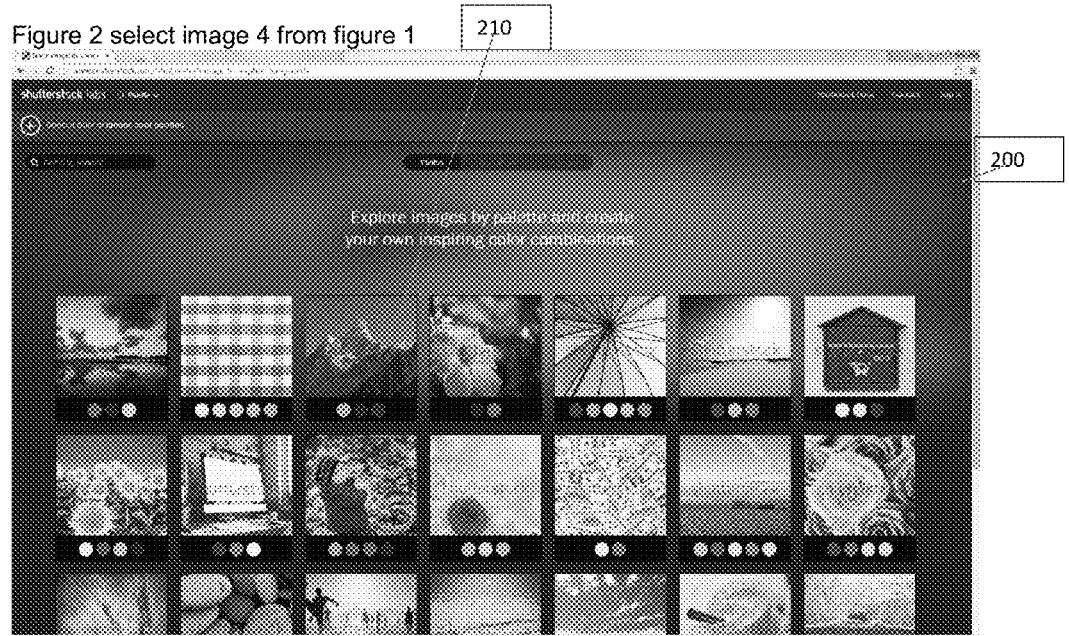

Figure 3 select image 3 from figure 2
Figure 4 select image 1 from figure 3
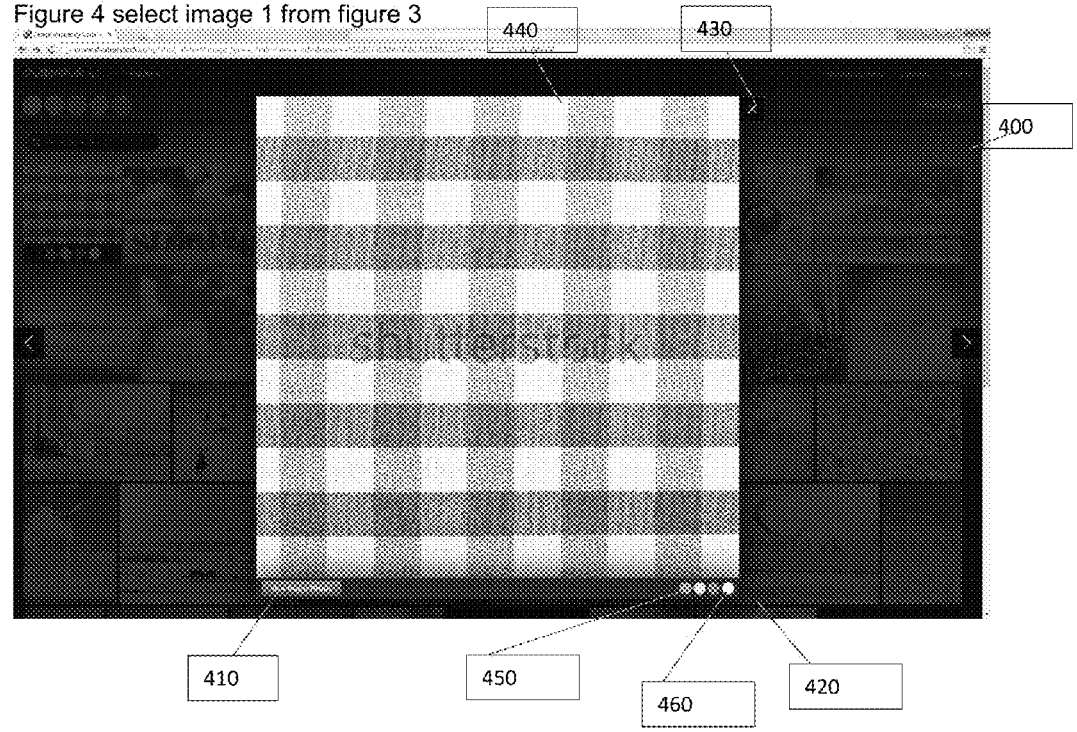

Figure 5 select palette associated with image 1 from figure 3
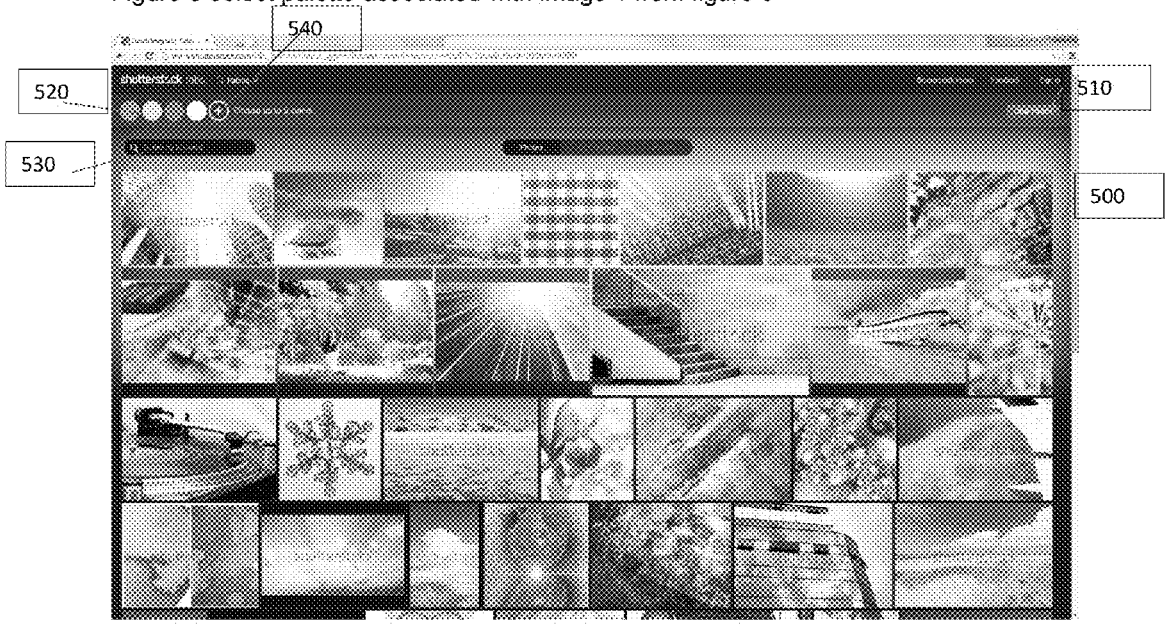
Figure 6
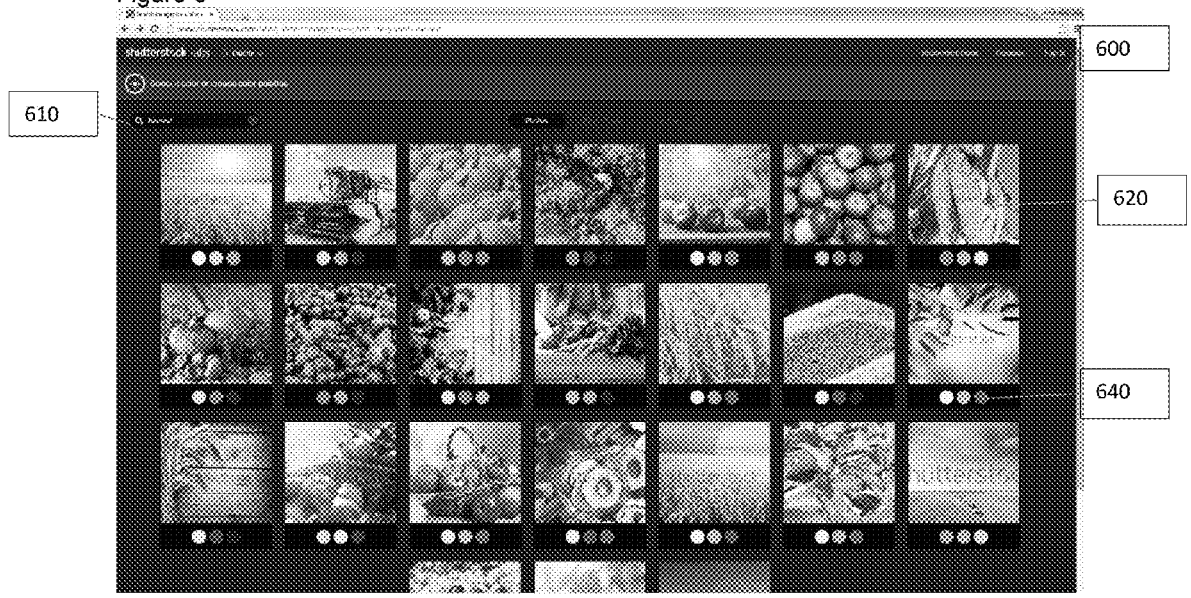

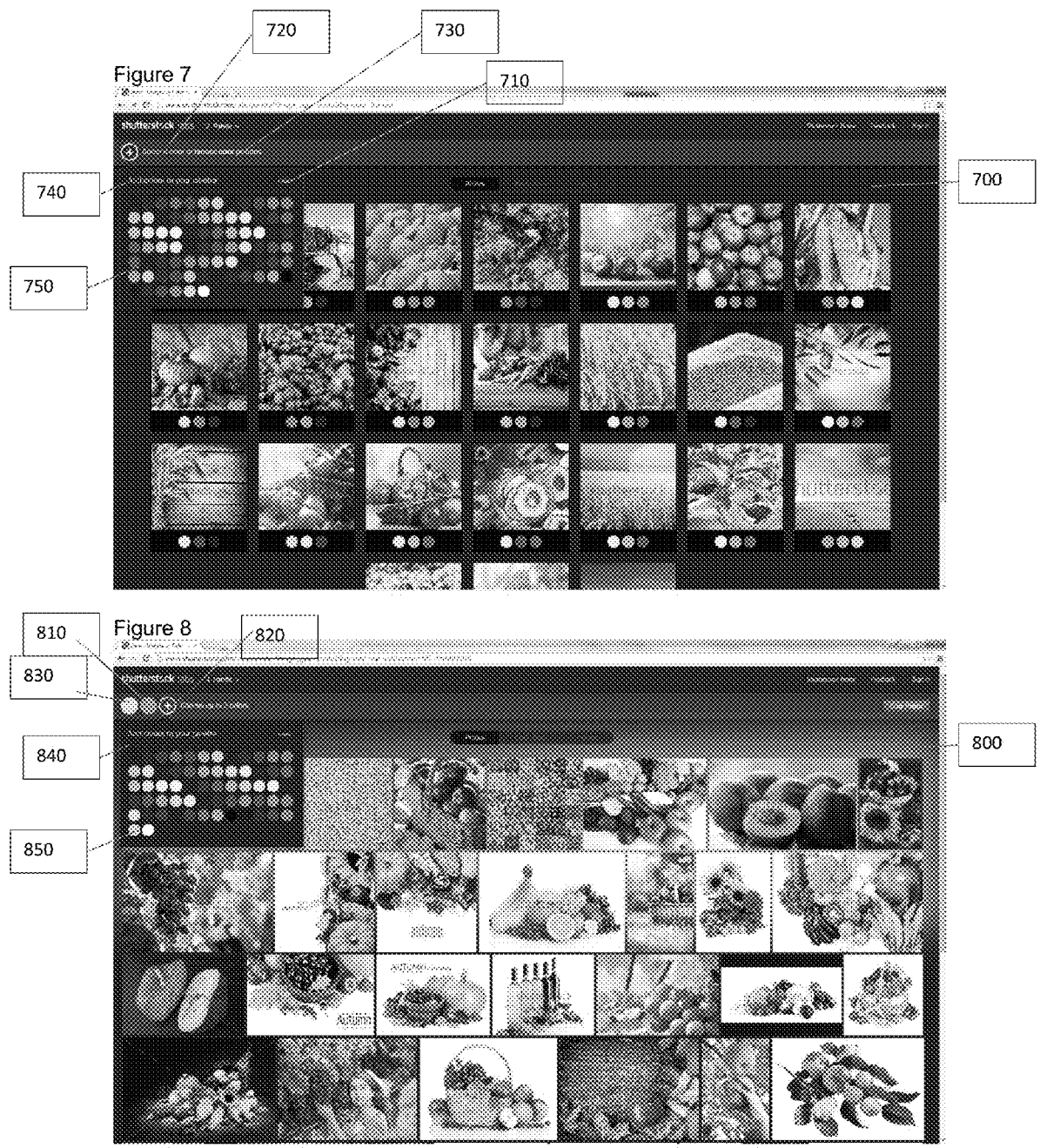

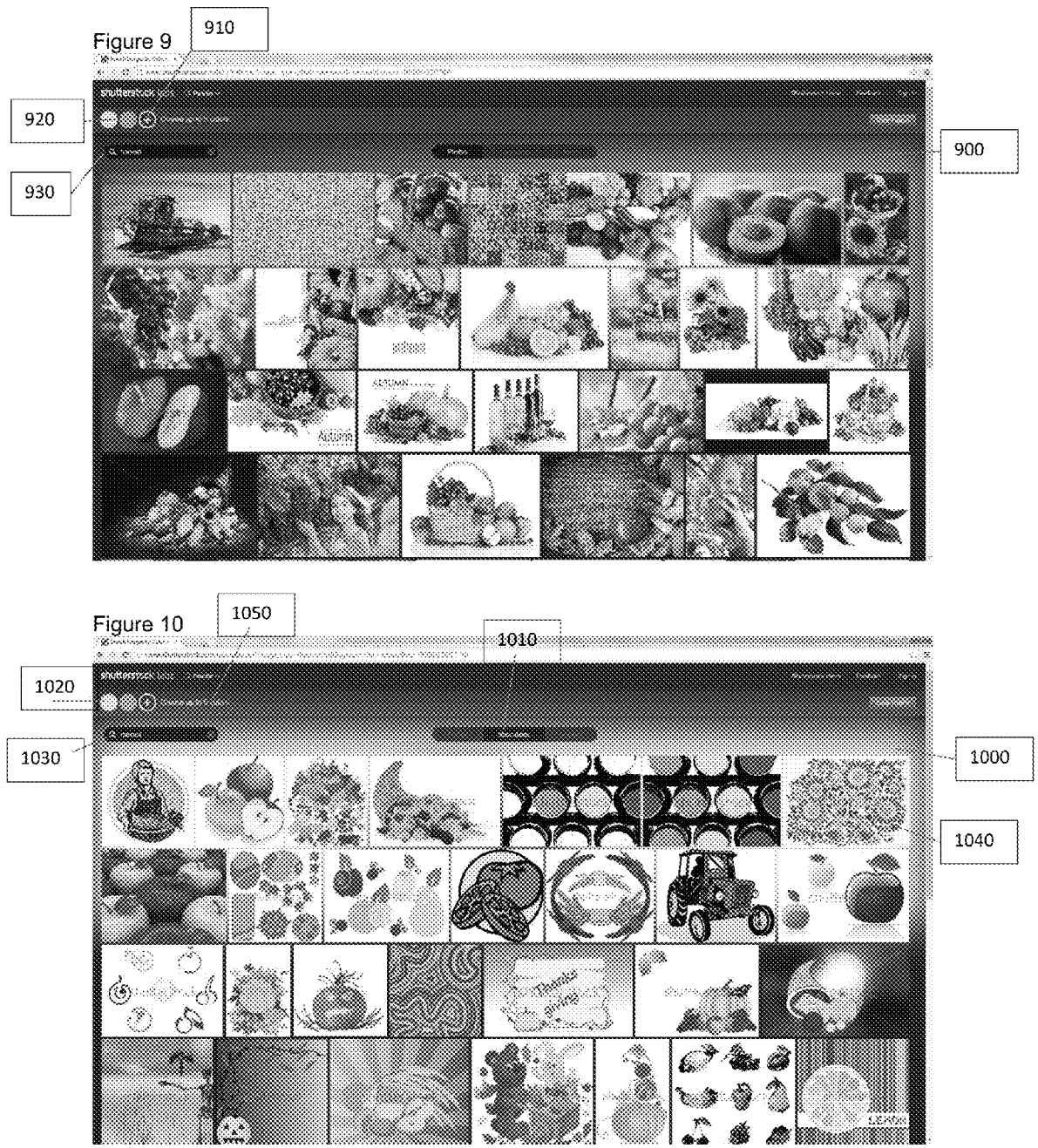

Figure 13

| Palette Number | Color 1 | Color 2 | Color 3 |
|---|---|---|---|
| 1 | green | blue | red |
| 2 | green | blue | light red |
| 3 | green | blue | dark red |
| 4 | green | blue | darker red |
| 5 | green | blue | yellow |

Figure 14

[green, blue] => [red, light red, dark red, darker red, yellow]

Figure 15

| Iteration Number | Color 1 | Color 2 | distance between color 1 and color 2 | Palette Number |
|---|---|---|---|---|
| 1 | red | light red | 10 | 2 |
| 2 | red | dark red | 10 | 3 |
| 3 | red | darker red | 20 | 4 |
| 4 | red | yellow | 50 | 5 |

Figure 16

| Palette Number | Color 1 | Color 2 | Color 3 |
|---|---|---|---|
| 1 | green | blue | red |
| 5 | green | blue | yellow |

SYSTEMS AND METHODS FOR COLOR PALLETE SUGGESTION

This application claims the benefit of provisional patent application No. 61/988,962 entitled "Color Palette Suggestions" which was filed May 6, 2014 and is incorporated herein by reference.

BACKGROUND

1. Field of Disclosure

The present disclosure generally relates to a color palette suggestion system and, more particularly, to systems and methods for conducting a keyword and a color palette based image search in response to a user presenting a search query.

2. Brief Description of Related Art

Searching pertinent images over the Internet can be a particularly challenging task for artists and designers. The commercial systems may require an artist to select a single image from a pool of millions of images that may be retrieved for a keyword search query. In marketing, the precise image selection for a product may directly be linked with the commercial success of a product. An artist may be required to conduct a complex search query to perform an image search based on a keyword and a color. In that case, artists may have to create and discover color palettes to meet their business needs or aesthetic tastes. For example, when an artist is searching for the keyword "ocean," the Internet search engine may return a large number of images associated with the keyword ocean in various colors and shades.

The artist may then have to run a second query to locate a desired image in a desired color combination from the pool of several images. For example, the artist may have to specifically configure a query to fetch all images that are associated with the keyword "ocean" and that are blue in color. The above mentioned query may be run by the existing image search systems to perform a two layered image search i.e. first images are searched by a keyword and the retrieved images are then searched by the color. Thus, the existing image search systems do not offer a palette selection option, coupled with a keyword search option. Further, the artist using existing image search systems may have to reinvent a palette for each keyword search since there does not exist a way to save and export preferred color pallets. Furthermore, the artist does not have a way to take advantage of image selection trends reflected by the image retrieval and download data gathered from the previous searches performed on the particular keyword and color selection. Accordingly, a need exists for a palette selection system that can present images based at least on the image trend, the color criteria and the keyword criteria.

It is difficult for multimedia retrieval systems to precisely know which particular image is of interest to a given user. A user may be interested not only in a particular color image but may also wish to obtain a particular image associated with a specific keyword. Furthermore, the user may be interested in a specific combination of colors or a specific combination of the colors and shades of colors. The desired combination of color palettes may be very clear in the mind of the user, however communicating this information from the end user to the image searching engine may be a challenge nevertheless. On the other hand, at times the desired combination of color palettes may not be clear in the mind of the user. In that case, the user may be able to identify a similar image of interest. A need exists for extracting color pallets from a similar image of interest and using the extracted pallet to locate the image of interest to the user.

Accordingly a need exists whereby a user can specify the desired color pallet indicating not only specific colors and shades but a combination of the desired colors and shades in conjunction with specifying a keyword search criteria for precisely locating a desired image.

BRIEF SUMMARY

By way of introduction only, the present embodiments provide methods and systems for color palette suggestions and for conducting a keyword, and a color palette based image search in response to a user presenting a search query, the method comprising: (1) searching a first database to locate a set of pertinent images satisfying the keyword and the color palette selection criteria; (2) displaying the set of pertinent images and the set of colors associated with the set of pertinent images on the user interface; (3) generating a set of suggested color palettes by iteratively extracting a suggested color palette from each image in the set of pertinent images; (4) displaying on the user interface, in response to receiving a user selection of a single color option, the set of pertinent images which match the keyword and the single color specified by the single color option; (5) displaying on the user interface, in response to receiving an input of a first set of colors selected via a color palette suggestion option, the set of pertinent images which match the combination specified by the first set of colors; (6) dynamically extracting and displaying on the user interface the color palette from a first image in response to receiving an input indicating a cursor hovering over the first image on the user interface; and (7) performing a first set of operations in response to receiving a user selected color palette extracted from the first image.

The foregoing discussion of the preferred embodiments has been provided only by way of introduction. Nothing in this section should be taken as a limitation of the claims, which define the scope of the invention.

BRIEF DESCRIPTION OF SEVERAL VIEWS OF THE DRAWINGS

The patent or application file contains at least one drawing executed in color. Copies of this patent or patent application publication with color drawing(s) will be provided by the Office upon request and payment of the necessary fee.

FIG. 1 depicts an example of an interface for entering a keyword and a color palette selection criteria;

FIG. 2 depicts an example of an interface generated upon user selecting image 160, in FIG. 1;

FIG. 3 shows an example of an interface generated upon user selecting image 210 in FIG. 2;

FIG. 4 shows an example of an interface resulting from the user selecting an image in FIG. 3;

FIG. 5 illustrates an example of an interface resulting upon the user selecting the color palette associated with the first image in FIG. 3;

FIG. 6 depicts an interface displaying the result set for user specified search term "harvest";

FIG. 7 displays the manner in which the color selection palette is configured;

FIG. 8 indicates the manner in which the user may select desired colors via the add colors option;

FIG. 9 illustrates an interface depicting a result set for a search term and color palette based image search;

FIG. 10 depicts an illustration result set containing illustrations for a search term and color palette based image search;

FIG. 13 displays the manner in which the disclosed method filters the palettes;

FIG. 14 shows the steps of common color identification and index generation is illustrated in an equation format;

FIG. 15 indicates the results of the color distance comparison according to the preferred embodiment of the disclosed invention;

FIG. 16 depicts a manner in which the result set is generated after filtering the palettes;

DETAILED DESCRIPTION OF THE PRESENTLY PREFERRED EMBODIMENTS

Figure 11:
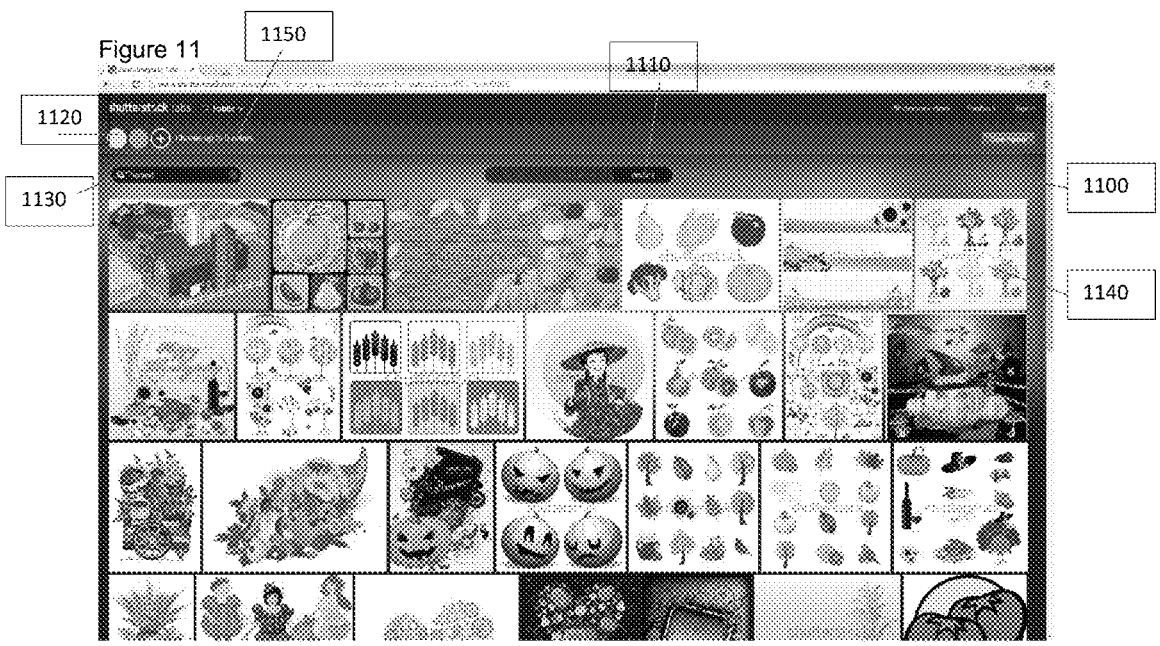
FIG. 11 depicts a vector result set containing vectors for a search term and color palette based image search.

The present disclosure describes computer implemented systems and methods, that may utilize an algorithm, to present color palette suggestions for conducting a keyword and a color palette based image search in response to a user initiated media file search.

Aspects of the present invention provide a color palette suggestion system for conducting a keyword, and a color palette based image search in response to receiving, on a user interface of a computing device, a user presented keyword and a color palette selection criteria the system comprising: at least one processor and at least one non-volatile computer-readable storage medium encoded with executable instructions that, when executed by the at least one processor, causes the at least one processor to provide a display of searched images, the system comprising: (1) a database search unit configured to search a first database to locate a set of pertinent images satisfying the keyword and the color palette selection criteria, the first database comprising an image representation (image), a set of keywords associated with the image, a customer behavior score for each keyword in the set of keywords, and a set of colors associated with the image; (2) an image display unit configured to display the set of pertinent images and the set of colors associated with the set of pertinent images on the user interface; (3) a color palette generation unit configured to generate a set of suggested color palettes by iteratively extracting a suggested color palette from each image in the set of pertinent images; (4) a single color image search unit configured to display on the user interface, in response to the receiving a single color option and a single color selection, the set of pertinent images which match the keyword and the single color selection; (5) a color palette suggestion unit configured to display on the user interface, in response to receiving a first set of colors by receiving a color palette suggestion option, the set of pertinent images which match the combination specified by the first set of colors; (6) a user interest management unit configured to dynamically extract and display on the user interface the color palette from a first image in response receiving input of the user hovering over the first image on the user interface; and (7) a first image processing unit configured to perform a first set of operations in response to receiving a user selected color palette, wherein the color palette is extracted from the first image.

The first set of operations may comprise: (1) retrieving the top four colors from the first image and the retrieving the color volume scores for the top four colors in the first image, (2) searching the second database to locate the set of pertinent images satisfying the keyword and a threshold color volume score criteria, and (3) generating for each color, a ranked display of the set of pertinent images based on the color volume scores of each image in the set of pertinent images. Note that the "top" colors may be any desired number of colors without departing from the invention. For example, the top five colors may be retrieved.

The disclosed method may search the second database in response to receiving a user selected keyword, a first color criteria and a color weight score criteria to locate the set of pertinent images satisfying the keyword, the first color criteria and the color weight score criteria. Alternatively, the disclosed method may search the second database in response to receiving a user selected keyword, a first color criteria, a color volume score and a color weight score criteria to locate the set of pertinent images satisfying the keyword, the first color criteria, the color volume score and the color weight score criteria.

The method comprise searching a first database to locate a set of pertinent images satisfying the keyword and the color palette selection criteria, the first database comprising an image representation (image), a set of keywords associated with the image, a customer behavior score for each keyword in the set of keywords, and a set of colors associated with the image. Additionally, in one embodiment of the disclosed invention the first database may store a color palette associated with the image as well as customer behaviors associated with the image.

Thus, if the user hovers over an image in the result set, the color palette that was extracted from that image in indexing step may be displayed to the user. In other words, the color palette for a given image may be stored along with the customer behavior scores for the image indicating user interest at some point in time, which may subsequently be used to grade the specific image. Accordingly, the palette extracted from a given image is tied to the customer behavior score for the given image, this information may be subsequently used to rank the palette as a whole across all images. Thus, for each image in the first database, the color palette and the customer behavior score for the image may be stored for subsequently ranking the images in the result set.

Likewise, the first database may also store a color volume score which may be computed beforehand for every image in the first database. The disclosed method may, when a user enters a query, retrieve the pertinent color volume scores associated with the images in the result set from the first database.

Further, the method may comprise displaying the set of pertinent images and the set of colors associated with the set of pertinent images on the user interface, generating a set of suggested color palettes by iteratively extracting a suggested color palette from each image in the set of pertinent images, and displaying on the user interface, in response to receiving a user selection of a single color option, the set of pertinent images which match the keyword and the single color specified by the single color option.

If the user selects a single color option, the search results may be updated to show only images that match the keyword and the single color. The color is matched against the weighted colors retrieved from each image and secondarily on the volume of the color in each image. In particular, the disclosed method may perform the following operations if a single color is selected via a single color selection option: (1) retrieving the set of pertinent images from the first database satisfying the keyword criterion; (2) comparing the single color to the combination of the color weight and the color volume score in each image that contains the selected color; and (3) displaying the result set comprising the images that match the keyword criterion and the single color on the user interface.

Furthermore, the method may comprise the steps of displaying on the user interface, in response to receiving an input of a first set of colors selected via a color palette suggestion option, the set of pertinent images which match the combination specified by the first set of colors, dynamically extracting and displaying on the user interface the color palette from a first image in response to receiving an input indicating a cursor hovering over the first image on the user interface, and performing a first set of operations in response to receiving a user selected color palette extracted from the first image.

The disclosed method may extract a color histogram of the manually selected image and search a second database to locate the set of pertinent images having matching proportions of each color displayed in the color histogram, wherein the second database comprises a color, a color volume score and an image, wherein the color volume score for the color indicates the percentage of the image covered by the color.

A user may, via a user interface, enter one or more keywords as a search query. This is illustrated in FIG. 6. Additionally, the user may also select one or more color for creating a color selection criteria for conducting the image search, this phenomenon is illustrated in FIGS. 7, and 8. Upon the user entering a search term, the disclosed method may query the first database to locate a result set, wherein the result set may contain the images that meet the search criteria i.e. tags of the images in the result set match with the user specified search term and the color selection criteria.

The search results may be displayed on the user interface in a grid of images. Similarly, a list of colors that are present among the result set may be displayed to the user. The list of colors may be sorted based on the number of images in the result set that have the given color. In other words, the list of colors may also be sorted by the number of images in the set of pertinent images displaying a particular color in the list of colors. Thus, for example, if red color is present in all the images, then the red color will be at the top of the list and if blue color is present in only one image then blue color will be at the bottom of the list. In other words, the list of colors may be sorted as in a Faceted Search.

The color palette suggestions may be sorted based on the customer behavior score for the matching search term. The sorted color palette suggestion may be presented on the user interface as shown in FIG. 7. The color palette may be a visually similar color palette. For example, for a given three color palette, visually similar color palettes share two of the same colors and the third color is a near match. The disclosed method may remove visually similar palettes in order to provide a better variety to the user in an event a search yields to multiple visually similar color palettes. For example, the method may remove a one of the two selected colors if the two selected colors are shades of the same colors or a near match.

The disclosed method may remove visually similar palettes in order to provide a better variety to the user in an event a search yields multiple visually similar color palettes. For example, if the first palette shown in the results contains a light yellow, light orange, and light brown color. The search results may also include a second palette of light yellow, light orange, and a slightly darker brown colors, or third palette of light yellow, a darker orange, and a darker brown colors. In this scenario, the disclosed method may compare the customer behavior scores of the three palettes and observe that the customer behavior score of the first palette is higher than the second pallet and the third palette. Since multiple palettes, i.e. second and third palettes are present in the search results, the disclosed method may only show the palette with the highest customer behavior score, and remove the second pallet and the third palette.

The disclosed method may conduct an image search in response to a user presenting a keyword and a color palette selection criteria on a user interface of a computing device. The term "image search" referred to in this application implies searching any type of digital image file format for which RGB color data can be extracted. An example of an interface for entering a keyword and a color palette selection criteria is shown in FIG. 1.

FIG. 1 illustrates a screen shot of the user interface 100 which provides the user an ability to search for photos of interest by selecting option 110, illustrations of interest by selecting option 170, and vectors of interest by selecting option 180. Also displayed on the interface 100 are the images indicated by the reference numeral 150 and the color palettes extracted from the images referenced by the reference numeral 140. The disclosed method may have an ability to search for photos which may consist of any image produced by a camera, illustrations which may include any image created by an artist either by hand or using digital tools, vectors which can be a type of image file where the contents of the image are defined by points, lines, polygons, mathematical equations, and the like. The vector search capability of the disclosed method may be beneficial for the user, since vectors can be scaled to any size without having an adverse impact on image quality, in contrast to a jpg image file, which may become blurry or pixelated when enlarged. The user may conduct an image search by entering a search term in the input box 130 and by selecting a color selection option 120. Optionally, the user may conduct an image search either by entering a search term in the input box 130 or by selecting a color selection option 120.

The photo search capability of the disclosed method is illustrated in FIGS. 1-9, the illustration search capability of the disclosed method is shown in FIG. 10. Now referring to FIG. 10 depicting an interface 1000 showing an illustration result set 1010 containing illustrations 1040 for a search term and color palette based image search. A search term input area 1030 on the interface 1000 contains the term "harvest" and the color selection option 1020 contains the colors yellow and peach since the user selected the search term "harvest" and two colors yellow and peach in the color selection option 1020. The add color button 1050 is displayed on the interface 1000 in FIG. 10 because only two colors out of a possible five colors have been selected by the user thus far.

Figure 12:
FIG. 12 depicts an interface showing a vector result set containing vectors for a search term and color palette based image search.

Likewise, the vector search capability of the disclosed method is depicted in FIGS. 11-12. FIG. 11 depicts an interface 1100 showing a vector result set 1110 containing vectors 1140 for a search term and color palette based image search. A search term input area 1130 on the interface 1100 contains term "harvest" and the color selection option 1120 contains the colors yellow and peach. The add color button 1150 is displayed on the interface 1100 in FIG. 11 because only two colors out of possible five colors have been selected by the user.

Similarly, the vector search capability of the disclosed method is depicted in FIG. 12. FIG. 12 depicts an interface 1200 showing a vector result set 1210 containing vectors 1240 for a search term and color palette based image search. A search term input area 1230 on the interface 1200 contains term "harvest" and the color selection option 1220 contains the colors yellow and peach. Alternatively, a delete color button may be located adjacent to each color whereby, the user may delete a selected color from the color selection palette. An example of this feature is shown in FIG. 12 where the message "remove this color" appears in proximity to the yellow color. The clear profile button 1250 may be used to start over the search process if user wishes to reset all search parameters on the interface 1200.

Now turning back to FIG. 1, the interface 100 depicts a search term input area 110 and a color selection option 120. The user may conduct image search by entering a search term in the input box 130. For example, if the user enters the search term "harvest" in the search term input area 110, then an interface 600 as shown in FIG. 6 will be displayed.

FIG. 6 depicts an interface 600 displaying the user specified search term "harvest" in the input area 610, and images 620 having color palettes 640. The images 620 are images of harvests, wherein the palette 640 of a given image indicates the colors that are present in the given image. Notably, the images contained in the image search result set displayed on the interface 600 are not classified based on the color of the images in the result set because no color criterion has been specified by the user. Thus, a user may conduct a search term based image search using the disclosed method of image search. Likewise a user may, without providing a search term for conducting image search, conduct a color based image search using the disclosed method of image search, as shown in FIG. 5.

Referring back to FIG. 1, upon the user selecting the fourth image in the first row of FIG. 1 indicated by the reference numeral 160, the interface 200 shown in the FIG. 2 is generated. Similarly, upon the user selecting third image in the first row of FIG. 2 indicated by the reference numeral 210, the interface 300 shown in the FIG. 3 is generated. Upon the user selecting the color palette associated with the first image in FIG. 3, interface 500 shown in FIG. 5 is generated.

FIG. 5 depicts an interface 500 resulting from a color based image search. Using the disclosed method, a user may conduct an image search by selecting a color selection option 520. Notably, a search term input area 530 on the interface 500 is empty since the user selected a color based image search option by only selecting a color without specifying the search term 530. While configuring a color based image search query, the user may select a predetermined number of colors to specify the color palette selection criteria. Optionally, if user wishes to reset all search parameters then a clear profile button 510 on interface 500 may be used to start over the search process. Alternatively, a delete color button may be located adjacent to each color whereby, the user may delete a selected color from the color selection palette 520.

In the preferred embodiment of the disclosed invention, for example, the user may iteratively select a color by selecting an add color button 540 to select up to five colors while specifying the color palette selection criteria. Alternatively, any number of colors may be selected while configuring the color palette selection criteria. The add button 540 may be displayed until the user has selected the predetermined number of colors to specify the color palette selection criteria.

Notably, in one embodiment of the disclosed invention, any number of colors may be selected while configuring the color palette selection criteria. The add color button 540 may be displayed until the user has selected the predetermined number of colors to specify the color palette selection criteria colors. As seen in FIG. 5, because only four colors which are shades of blue and white are selected, the add color button 540 is displayed on the interface 500. As seen in FIG. 5, because only four colors which are shades of blue and white are selected, the add color button 540 is displayed on the interface 500. In contrast to the add color button 540 in FIG. 5, the add color button is not displayed on the interface 300 in FIG. 3 because all five colors have been selected in FIG. 3.

FIG. 3 depicts displaying an interface 300 resulting from the user selecting third image from the first row indicated by the reference numeral 210 on the interface 200 shown in FIG. 2. Using the disclosed method, the user may conduct an image search by selecting a color selection option 320 and a search term input area 330 on the interface 300 to conduct a color based and search term based image search. Alternatively, the user may either select a color selection option 320 or specify the search term in the search term input area 330 to conduct an image search. As described above, the user may select a predetermined number of colors to specify a color based image search query. As shown in FIG. 5, the user has selected five shades of white and blue colors without specifying a search term criteria in the search term input area 330.

In this case, the method according to the disclosed invention, for example, may generate a display of several images that meet the user specified color selection criteria. While the contents of the images may vary, for example the interface 300 showcases the images of various manmade objects along with images of creations of nature such as sky, clouds, beach, city, balloons, keyboard and the like. Each object displayed in the interface 300 however, follows the color scheme selected by the user via the color selection option 320. The user may at this point, specify the search term in the search term input area 330 to locate images that meet both the color selection criteria as well as the search term criteria. Alternatively, the user may select an image of interest indicated by the reference numeral 340 from the images displayed on the interface 300. This scenario is illustrated in the FIG. 4.

Turning now to FIG. 4, which displays an interface 400 showing image 440. Notably, the interface 400 in FIG. 4 is displayed upon the user selecting the image 340 in FIG. 3. As shown in FIG. 4, an enlarged version of image 340 is displayed on the interface 400. Notably the images on the interface 300 other than image 340 are faded in the background while the enlarged version 440 of the selected image 340 is displayed on the interface 400. The user may generate a view details interface, not shown in FIG. 4 for image 440 by selecting the view image details option 410. The view details interface may indicate pertinent information regarding the image 440 such as image title, image identification information, image copyright information, image license information such as image size, image resolution, memory space required to store the image, and the like. Additionally, a download option may be displayed on the view image details page allowing the user to download the image 440. Optionally, the view details interface may allow the user to save image 440 for subsequent use, find images similar to image 440, and share the image 440 via social media.

A color palette 420 may also be displayed on the interface 400 showing colors displayed in the image 440. In a preferred embodiment of the disclosed invention, the order of the colors displayed in the color palette is of significance, in particular, the color having highest weight is displayed in the leftmost position in the color palette while the color having lowest weight is displayed in the rightmost position in the color palette. For example, light blue color indicated by the reference numeral 450 has the highest weight in the image 440, thus is placed at the leftmost position in the palette 420. In contrast white color indicated by the reference numeral 460 has the lowest weight in the image 440, accordingly the white color 460 is placed at the rightmost position in the palette 420.

The manner in which the color selection palette is configured is illustrated in FIG. 7. Notably no color is selected by the user in the color selection pallet area of the interface 700. Thus, a select color option indicated by the reference numeral 720 and a browse color palettes option indicated by the reference numeral 730 are displayed on the interface 700. If the user selects the browse color palettes option 730, then the interface 200 shown in FIG. 200 is displayed whereby a set of images of various colors are displayed to the user, and the user can select one of the images to view additional images having the same color palette as the color palette of the selected image.

When the browse color palettes option 730 is selected the disclosed method may update the image search results on the user interface to only show palettes that match the selected colors. In other words, if the user clicks on a palette suggestion the result set may be updated to only show images that match the given color combination. Additionally, the palette suggestions on the user interface may be updated to show multicolor palettes that contain the selected colors. For example, if the user selected a multicolor palette with 3 colors, the palette suggestions may show palettes with 4 colors. Similarly, if the user selected a palette with 4 colors, the user interface may show palette suggestions with 5 colors. In other words, the disclosed method may display N+1 color palettes when a multicolor palette with N colors is selected via the color palette suggestion option.

In one embodiment of the disclosed invention, if a user clicks on the palette the following actions may take place: (1) The top 4 colors for the image may be retrieved along with the color volume scores for that image; (2) the 4 retrieved colors may be entered into the search query along with the color volume scores as boost parameters; and (3) the images in the search result set may match all the given colors and the search term, and may be ranked based on how close in volume each of their colors matches the volume of each color in the selected image.

Likewise, the user may select a select color option indicated by the reference numeral 720 on the interface 700. Resultantly, an add colors to your palette option 740 displaying a color set 750 may be displayed on the interface 700. The user may select desired colors from the color set 750, and consequently the selected colors may appear in the color selection palette on the interface 700. This phenomenon is illustrated in FIG. 8. The user may conclude the color selection process by selecting the close color set option 710 on the interface 700. The color set may disappear upon the user selecting the close color set option 710.

FIG. 8 illustrates a manner in which the user selected colors appear in the color selection palette. As described above in conjunction with FIG. 7, initially no color was selected by the user on the interface 700, and after the user selecting a color option 720, the add colors to your palette option 740 displaying a color set 750 may be displayed on the interface 700.

Similarly, an add colors to your palette option 840 displaying a color set 850 may be displayed on the interface 800. The user may select desired colors from the color set 850 by selecting add colors option 820. On interface 800 the colors yellow indicated by the reference numeral 830 and the color peach indicated by the reference numeral 810 are selected by the user. Consequently the selected colors yellow 830 and peach 810 are displayed on the color selection palette area on the interface 800.

Turning back to FIG. 1 optionally, the user may conduct an image search by entering a search term in the input box 130 and by selecting a color selection option 120. This phenomenon is illustrated in FIG. 9. Referring now to FIG. 9 where interface 900 depicts a result set for a search term and color palette based image search. A search term input area 930 on the interface 900 contains term "harvest" and the color selection option 910 contains the colors yellow and peach since the user selected a search term and a color based image search option by providing the search term "harvest" and by selecting two colors. The add button 910 is displayed on the interface 900 in FIG. 9 because only two colors out of possible five colors have been selected by the user.

The disclosed method may generate a visually distinct set of suggested color palettes by filtering visually similar color palettes from the set of suggested color palettes by performing the following steps for each palette in the set of suggested color palettes: (1) creating an index of all combinations of N−1 colors, when a multicolor palette with N colors is selected via the color palette suggestion option; (2) count the number of times each set of N−1 colors is present in the index; (3) comparing the $N^{th}$ colors for each color palette from the set of suggested color palettes if there is more than one instance of a set of N−1 colors; and (4) removing one of the color palettes from the result set if the distance between any two $N^{th}$ colors is below a predefined threshold.

In one embodiment of the disclosed invention if each palette in the search result set has N colors, the method may create an index of all combinations of N−1 colors. The manner in which the disclosed method filters the palettes is illustrated in FIG. 13. Referring now to FIG. 13, the table 1300 has five palettes. Each palette in the search results shown in FIG. 13 is indicated by palette number 1310. The color 1, color 2 and color 3 are indicated by the reference numerals 1320, 1330, and 1340 respectively and may reflect a specific color contained in the given palette. For example, the first palette has green, blue and red colors. The second palette has green, blue and light red colors. Similarly, the third palette has green, blue and dark red colors. Likewise, the fourth palette has green, blue and darker red colors. The fifth palette has green, blue and yellow colors.

Notably, each of the palettes 1-5 shown in table 1300 has 3 colors, so the method may determine the value of N to be three. Accordingly, the method according to the preferred embodiment of the disclosed invention may create an index of palettes that have (N−1) common colors, since the value of N is three in the example shown the FIG. 13, the disclosed method may (1) identify the common colors contained in the palettes 1-5 and (2) create an index of palettes that have two common colors. As seen from column 1 indicated by the reference numeral 1320 and from column 2 indicated by the reference numeral 1330, each of the palettes 1-5 have two colors in common which are green and blue. After identifying the common colors the method may create the index for the two common colors, which may include colors red, light red, dark red, darker red, and yellow colors. In other words the index may contain each color in each palette that is not contained in the identified list of common colors.

The steps of common color identification and index generation is illustrated in an equation format in FIG. 14, where common colors are indicated by the reference numeral 1410 and the generated index is indicated by the reference numeral 1420. The disclosed method may then iteratively process each color in the generated index i.e. red, light red, dark red, darker red and yellow colors. In particular, the method may, using the Euclidean distance of the RGB color values, determine the color distance between a given color and the colors in the index other than the given color. The method may delete a specific palette from the index if the distance between two of the colors is less than a predetermined threshold value.

The results of the color distance comparison are shown in FIG. 15. Now referring to FIG. 15 where table 1500 reflects the results generated after comparing the first color in the index which is red with the other colors in the index i.e. light red, dark red, darker red and yellow colors. The number 1510 refers to the number of iteration of the comparison, as such four instances of comparisons are shown in FIG. 15 where the distance 1540 reflects the Euclidean distance of the RGB color values of color 1 indicated by the reference numeral 1520 and color 2 indicated by the reference numeral 1530. For instance, the distance 1540 is between the colors red and light red is 10 at number 1 in table 1500, while the distance 1540 between the colors red and dark red is 10 at number 2 in table 1500. Similarly, the distance 1540 is between the colors red and darker red is 20 and the distance 1540 is between the colors red and yellow is 50 in table 1500. The field palette number 1550 indicates the palette in which the Color 1 and Color 2 are contained, for example, as seen from the Table 1300 in FIG. 13, the palette number 2 contains light red color, the palette number 3 contains dark red color, the palette number 4 contains darker red color, and the palette number 5 contains yellow color.

For example, if the predetermined threshold value is 40, then the palette numbers 2, 3 and 4 containing light red, dark red and darker red colors respectively, may be removed from the result set because the palettes 2, 3 and 4 had lower customer behavior scores than the palette number 1 containing the red color. Additionally, the palette numbers 2, 3 and 4 are removed from the result set because the distance between the red color and each of the light red, dark red, and darker red colors was 10, 10 and 20 respectively, which is less than the predetermined threshold value 40. However, the palette number 5 containing yellow color may still remain in the result set because the distance between the red and yellow colors is 50 which is more than the predetermined threshold value 40.

Referring now to FIG. 16, indicating the result set generated after filtering the palettes. The table 1600 reflects the result set containing two palettes indicated by palette number 1610. As described above, the disclosed method may iteratively process each color in the generated index by determining the color distance between a given color and the colors in the index other than the given color and delete palettes 2-4 from the index since the distance between the color red and the colors contained in the palettes 2-4 is less than the predetermined threshold value 40. Accordingly, the remaining palettes in the index may contain the color 1, color 2 and color 3 indicated by the reference numerals 1620, 1630, and 1640 respectively. For example, the first palette has the colors green, blue and red. The fifth palette has green, blue and yellow colors.

Figure 17:
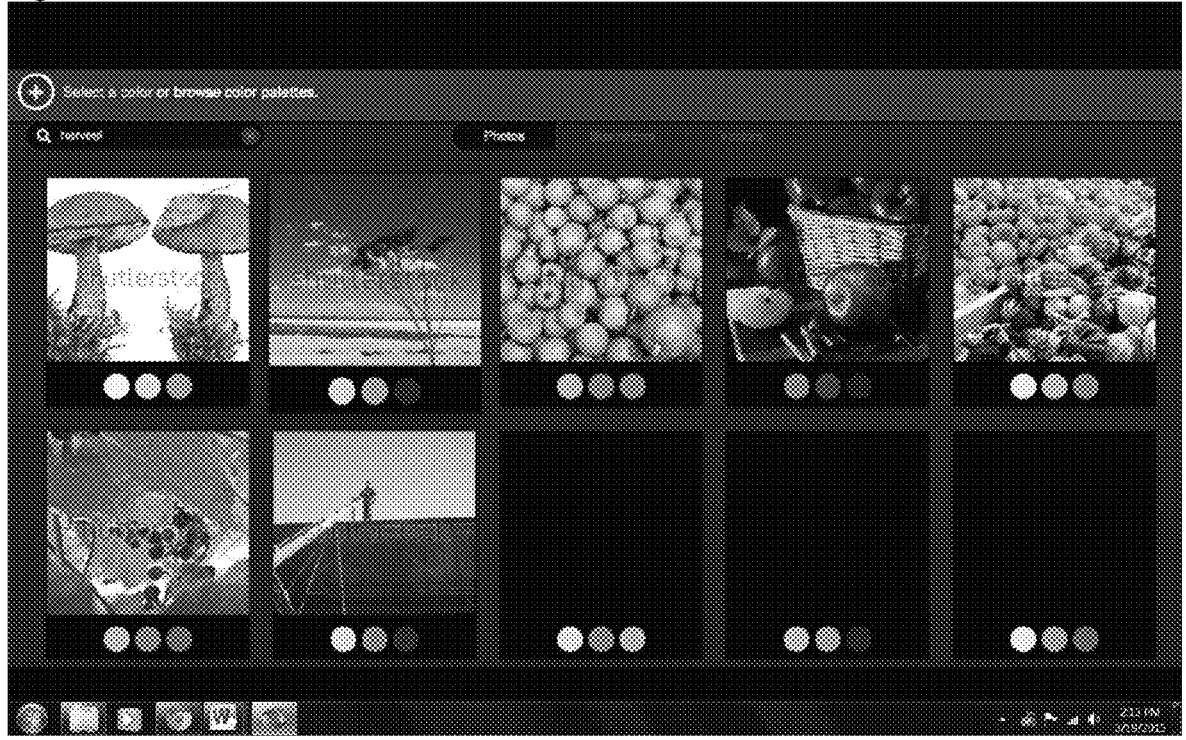
FIG. 17 depicts a result set generated in response to a user query for the search term harvest before filtering the color palettes.
Figure 18:
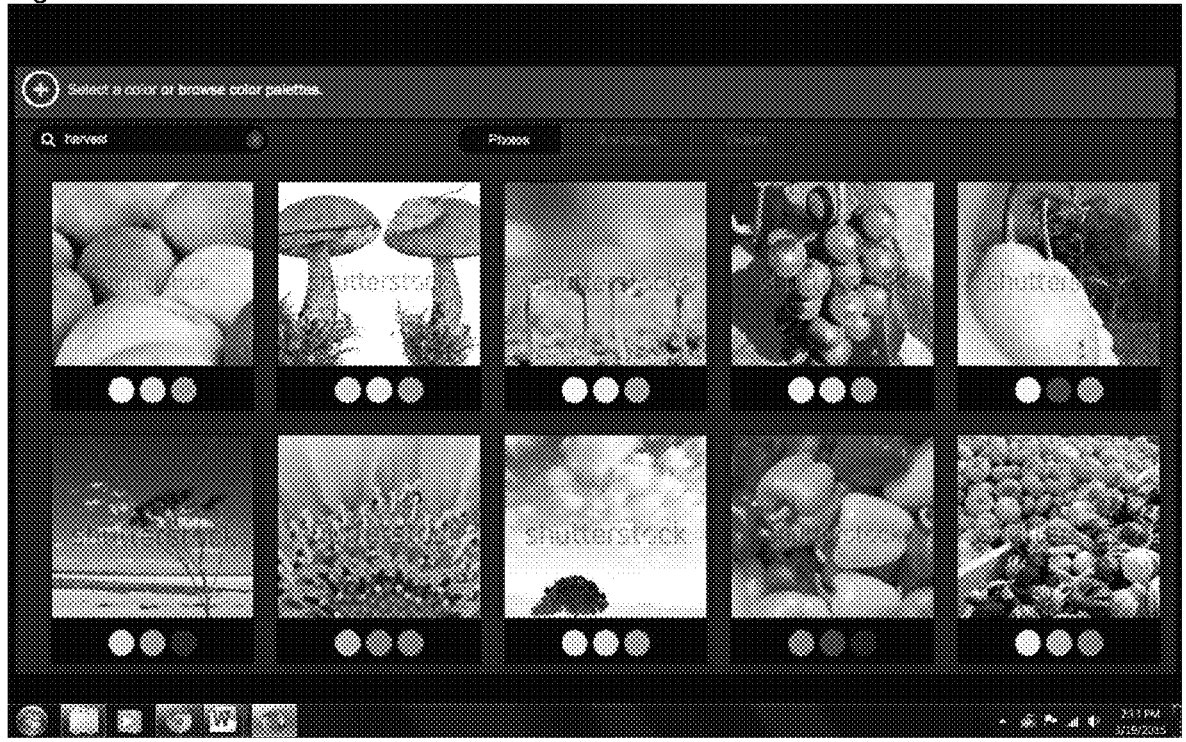
FIG. 18 reflects the result set displayed in FIG. 17 after filtering the color palettes.

FIG. 17 depicts a result set generated in response to a user query for the search term harvest before filtering the color palettes. FIG. 18 reflects the result set displayed in FIG. 17 after filtering the color palettes.

Figure 19:
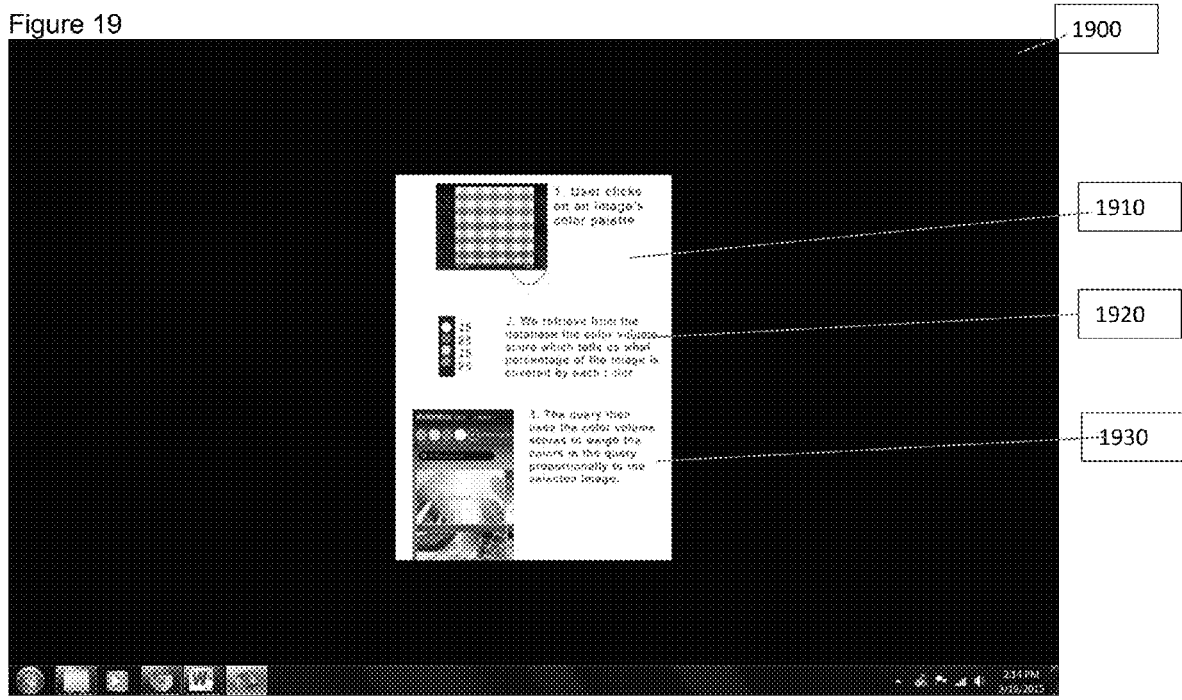
FIG. 19 depicts an interface showing events occurring upon a user selecting a specific palette on the user interface.

FIG. 19 depicts interface 1900 showing events occurring upon a user selecting a specific palette on the user interface. The event indicated by the reference numeral 1910 takes when a user clicks on a color palette associated with an image. The disclosed method at event 1920 may retrieve the color volume scores, for that image, indicating the percentage of the image covered by a given color. As shown in FIG. 19, the color volume score for each color is 25% for the selected image. Additionally, the top 4 colors for the image may also be retrieved at event 1920. At event 1930, the disclosed method may use the color volume scores generated in the event 1920 to weigh the colors in the query proportionally to the selected image. Accordingly, the 4 colors may be entered into the search query along with the color volume scores as boost parameters. The method may return a ranked result set containing images that match with all of the colors in the selected palette and the search term, wherein the result set is ranked based on how close in volume each color in each image matches the volume of each color in the selected image.

Figure 20:
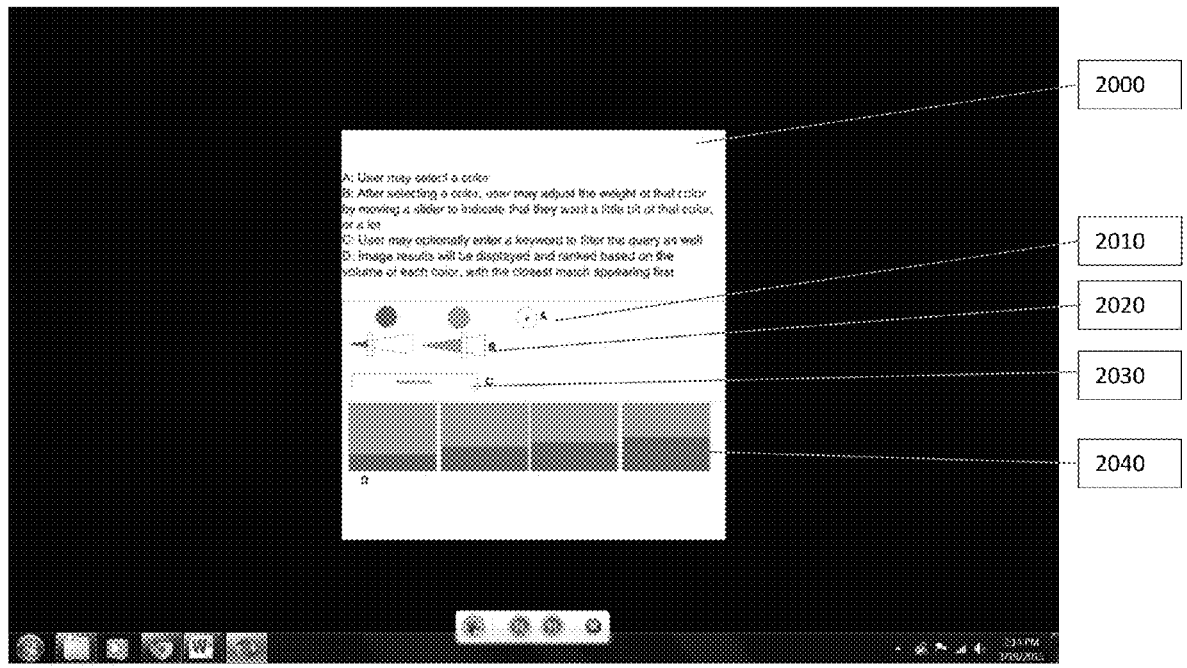
FIG. 20 illustrates configuration of various parameters for conducting an image search.

FIG. 20 illustrates an interface 2000 that graphically displays a manner in which various parameters are configured for conducting an image search. The user may select one or more colors and specify weights 2020 for each color in order to retrieve a set of images that match the proportions of each color in the query. Two colors blue and red are selected in FIG. 20. The user may increase the weight of a color by selecting weight increase measure 2010.

Similarly, the user may reduce the weight of a color by selecting weight increase measure 2050, not shown in FIG. 20. The configured weight for a given color may be indicated by a sliding scale 2020 corresponding to the selected color. Thus, controls weight increase measure 2010 and the sliding scale 2020 may be used by the user to manually configure the proportion of each color. Accordingly, the disclosed method may allow accepting a selected color weight score criteria by manually defining the proportion of each color via a control located on a first interface. Alternatively, the disclosed method may allow selecting the color weight score criteria by manually selecting an image from the user interface.

Alternatively, the user may enter a search term in the search term input area 2030 for conducting an image search. The selected color weights of each color may be graphically displayed together in the combined weight area 2040. Optionally, the user may be able to specify the volume of each color used in the query by providing or choosing any image, from which the color histogram will be extracted and a query assembled which will include the proportions of each color from the specified image. The user may be able to save a palette created by the user, subsequently retrieve the saved palette, and apply the retrieved palette to a search query. Similarly, trending palettes or popular palettes may be displayed to users based on customer behavior scores indicating the popularity of a given palette for specific searches and at specific times.

We claim:

1. A method for searching images comprising:
   receiving a search request from a user comprising a keyword and a color palette selection criteria selected from a user interface of a computing device;

searching a first database to locate a set of pertinent images satisfying the keyword and the color palette selection criteria, the first database comprising at least one keyword, a set of keywords associated with each of the images, a customer behavior score for each keyword in the set of keywords, and a set of colors associated with each of the images;

displaying the set of pertinent images and the set of colors associated with the set of pertinent images on the user interface;

generating a set of suggested color palettes by extracting a suggested color palette from each image in the set of pertinent images;

in response to a manual selection of an image in the set of pertinent images from the user interface, selecting a color weight score criteria, extracting a color histogram of the manually selected image, and searching a second database to locate the set of pertinent images having matching proportions of each color displayed in the color histogram, wherein the second database comprises a color, a color volume score and an image, wherein the color volume score for the color indicates the percentage of the image covered by the color;

when receiving a user selection of a single color option from at least one of the suggested color palettes, updating the set of pertinent images to match the keyword and the single color specified by the single color option;

when receiving an input of a first set of colors selected from at least one of the suggested color palettes, updating the set of pertinent images to display a subset of the set of pertinent images having an associated set of colors comprising a subset of colors that match the combination specified by the first set of colors; and when identifying a user interaction with a first image from the set of pertinent images, displaying on the user interface a color palette from the first image.

2. The method of claim 1, further comprising the steps of generating a visually distinct set of suggested color palettes by filtering color palettes sharing at least two same colors from the set of suggested color palettes by performing the following steps for each palette in the set of suggested color palettes:

creating an index of all combinations of N−1 colors, count the number of times each set of N−1 colors is present in the index, comparing the Nth colors for each color palette from the set of suggested color palettes if there is more than one instance of a set of N−1 colors, and removing one of the color palettes from the result set if the distance between any two Nth colors is below a predefined threshold, wherein N is an integer value.

3. The method of claim 2, further comprising the steps of performing the following operations if a single color is selected via a single color selection option:

retrieving the set of pertinent images from the first database satisfying the keyword criterion;

comparing the single color to the combination of the color weight and the color volume score in each image that contains the selected color; and displaying the result set comprising the images that match the keyword criterion and the single color on the user interface.

4. The method of claim 2, further comprising the steps of displaying N+1 color palettes when a multicolor palette with N colors is selected via the color palette suggestion option.

5. The method of claim 4, wherein the list of colors is sorted by the number of images in the set of pertinent images displaying a particular color in the list of colors.

6. The method of claim 1, further comprising the step of accepting a selected color weight score criteria by manually defining the proportion of each color via a control located on a first interface.

7. The method of claim 1, wherein for a given three color palette, color palettes share two of the same colors and the third color is a near match.

8. The method of claim 1, wherein the first set of operations comprise:

retrieving the top four colors from the first image and the retrieving the color volume scores for the top four colors in the first image;

searching the second database to locate the set of pertinent images satisfying the keyword and a threshold color volume score criteria; and generating for each color, a ranked display of the set of pertinent images based on the color volume scores of each image in the set of pertinent images.

9. The method of claim 8, further comprising the step of searching the second database in response to receiving a user selected keyword, a first color criteria and a color weight score criteria to locate the set of pertinent images satisfying the keyword, the first color criteria and the color weight score criteria.

10. The method of claim 9, further comprise searching the second database in response to receiving a user selected keyword, a first color criteria, a color volume score and a color weight score criteria to locate the set of pertinent images satisfying the keyword, the first color criteria, the color volume score and the color weight score criteria.

11. A system for searching images comprising:

a memory comprising instructions and;

at least one processor configured to execute the instructions to:

receive a search request from a user comprising a keyword and a color palette selection criteria selected from a user interface of a computing device;

search a first database to locate a set of pertinent images satisfying the keyword and the color palette selection criteria, the first database comprising an image representation (image), a set of keywords associated with the image, a customer behavior score for each keyword in the set of keywords, and a set of colors associated with the image;

display the set of pertinent images and the set of colors associated with the set of pertinent images on the user interface;

generate a set of suggested color palettes by extracting a suggested color palette from each image in the set of pertinent images;

in response to a manual selection of an image in the set of pertinent images from the user interface, select a color weight score criteria, extract a color histogram of the manually selected image, and search a second database to locate the set of pertinent images having matching proportions of each color displayed in the color histogram, wherein the second database comprises a color, a color volume score and an image, wherein the color volume score for the color indicates the percentage of the image covered by the color;

when receiving a user selection of a single color option from at least one of the suggested color palettes, updating the set of pertinent images to match the keyword and the single color specified by the single color option;

when receiving an input of a first set of colors selected from at least one of the suggested color palettes, updating the set of pertinent images to display a subset of the set of pertinent images having an associated set of colors comprising a subset of colors that match the combination specified by the first set of colors; and when identifying a user interaction with a first image from the set of pertinent images, displaying on the user interface a color palette from the first image.

12. The system of claim 11, wherein the color palette suggestion unit is further configured to generate a visually distinct set of suggested color palettes by filtering color palettes sharing at least two same colors from the set of suggested color palettes by performing the following operations for each palette in the set of suggested color palettes:

create an index of all combinations of N−1 colors, count the number of times each set of N−1 colors is present in the index, compare the $N^{th}$ colors for each color palette from the set of suggested color palettes if there is more than one instance of a set of N−1 colors, and remove one of the color palettes from the result set if the distance between any two Nth colors is below a predefined threshold, wherein N is an integer value.

13. The system of claim 12, further configured to perform the following operations if a single color is selected via a single color selection option:

retrieve the set of pertinent images from the first database that match the keyword, compare the single color to the combination of the color weight and the color volume score in each image that contains the selected color, and display the result set comprising the images that match the keyword and the single color on the user interface.

14. The system of claim 12, further configured to display N+1 color palettes when a multicolor palette with N colors is selected via the color palette suggestion option.

15. The system of claim 14, wherein the list of colors is sorted by the number of images in the set of pertinent images displaying a particular color in the list of colors.

16. The system of claim 11, further configured to present a color weight score selection option on the user interface, whereby the proportion of each color is manually defined via a control located on a first interface.

17. The system of claim 11, wherein for a given three color palette, color palettes share two of the same colors and the third color is a near match.

18. The system of claim 11, wherein the first set of operations comprise:

retrieving the top four colors from the first image and retrieving the color volume scores for the top four colors in the first image, searching the second database to locate the set of pertinent images satisfying the keyword and a threshold color volume score criteria, and generating for each color in the selected image a ranked display of the set of pertinent images, wherein the ranking of the images is based on how close in volume the colors of a given image matches the volume of the color for which the ranked display is being generated.

19. The system of claim 18, further configured to search the second database in response to receiving the keyword, a first color criteria and a color weight score criteria to locate the set of pertinent images satisfying the keyword, the first color criteria and the color weight score criteria.

20. The system of claim 19, further configured to search the second database in response to receiving the keyword, a first color criteria, a color volume score and a color weight score criteria to locate the set of pertinent images satisfying the keyword, the first color criteria, the color volume score and the color weight score criteria.

* * * * *